US008594021B2

(12) United States Patent
Chin et al.

(10) Patent No.: US 8,594,021 B2
(45) Date of Patent: Nov. 26, 2013

(54) EFFECTIVE TIMING MEASUREMENTS BY A MULTI-MODE DEVICE

(75) Inventors: Tom Chin, San Diego, CA (US);
Kuo-Chun Lee, San Diego, CA (US);
Shan Qing, San Diego, CA (US);
Qingxin Chen, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 13/172,584

(22) Filed: Jun. 29, 2011

(65) Prior Publication Data

US 2012/0014258 A1   Jan. 19, 2012

Related U.S. Application Data (60) Provisional application No. 61/365,748, filed on Jul. 19, 2010.

(51) Int. Cl.
*H04W 4/00* (2009.01)
*H04L 12/26* (2006.01)

(52) U.S. Cl.
USPC ........................................... 370/328; 370/241

(58) Field of Classification Search
USPC ........... 455/434, 437, 513, 436; 370/328, 241
See application file for complete search history.

(56) References Cited

U.S. PATENT DOCUMENTS

| 7,515,909 | B2 * | 4/2009 | Jain et al. | 455/436 |
| 2004/0213278 | A1 | 10/2004 | Pullen et al. | |
| 2005/0032542 | A1 | 2/2005 | Wilborn et al. | |
| 2005/0165949 | A1 | 7/2005 | Teague | |
| 2006/0218302 | A1 | 9/2006 | Chia et al. | |
| 2007/0207824 | A1 * | 9/2007 | Bhattacharjee et al. | 455/513 |
| 2008/0075184 | A1 | 3/2008 | Muharemovic et al. | |
| 2008/0200169 | A1 * | 8/2008 | Gao | 455/434 |
| 2008/0274742 | A1 * | 11/2008 | Bi | 455/437 |
| 2009/0191862 | A1 | 7/2009 | Amirijoo et al. | |
| 2009/0245421 | A1 | 10/2009 | Montojo et al. | |
| 2010/0182911 | A1 | 7/2010 | Pullen et al. | |
| 2011/0145584 | A1 | 6/2011 | Coburn et al. | |

FOREIGN PATENT DOCUMENTS

| EP | 2043282 A1 | 4/2009 |
| WO | 2004091231 A1 | 10/2004 |
| WO | 2006107966 A1 | 10/2006 |

OTHER PUBLICATIONS

M Miyoshi et al.,"Performance Improvement of TCP in wireless cellular network based acknowledgement control", Department of Infomatics and Mathematical Secience, Gradute School of Engineering Science, Osaka University, Japan, Proceedings of the 7th Asia Pacific, pp. 1-15, 2001.
Miller et al., "Cumulative acknowledgement multicast repetition policy for wirless LANs or ad hoc network clusters" IEEE,Wireless Communication Technologies Group National Institute of Standards and Technology, Maryland Gaithersburg, pp. 3403-3407, 2002.
International Search Report and Written Opinion—PCT/US2011/044588—ISA/EPO—Dec. 2, 2011.

* cited by examiner

*Primary Examiner* — Mark Rinehart
*Assistant Examiner* — Gbemileke Onamuti
(74) *Attorney, Agent, or Firm* — Kristine U. Ekwueme (57) ABSTRACT

Certain aspects of the present disclosure relate to a technique for effective measurement in a second Radio Access Technology (e.g., TD-SCDMA) while receiving service in a first Radio Access Technology (e.g., GSM).

40 Claims, 8 Drawing Sheets

EFFECTIVE TIMING MEASUREMENTS BY A MULTI-MODE DEVICE

CLAIM OF PRIORITY UNDER 35 U.S.C. §119

The present Application for Patent claims benefit of Provisional Application Ser. No. 61/365,748, filed Jul. 19, 2010, and assigned to the assignee hereof and hereby expressly incorporated by reference herein.

BACKGROUND

1. Field

Certain aspects of the present disclosure relate generally to wireless communication systems, and more particularly, to techniques for effective inter-RAT measurements during a call.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UTMS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

Certain aspects of the present disclosure provide a method for wireless communications. The method generally includes while receiving service in a first RAT, acquiring system time in a second RAT, maintaining the system time while receiving service in the first RAT, determining if a control channel in the second RAT will be present during an inter-transmission period of the first RAT based on the acquired system time and processing the control channel in the second RAT if it is determined the control channel will be present in the inter-transmission period.

Certain aspects of the present disclosure provide an apparatus for wireless communications. The apparatus generally includes means for acquiring system time in a second RAT while receiving service in a first RAT, means for maintaining the system time while receiving service in the first RAT, means for determining if a control channel in the second RAT will be present during an inter-transmission period of the first RAT based on the acquired system time and means for processing the control channel in the second RAT if it is determined the control channel will be present in the inter-transmission period.

Certain aspects of the present disclosure provide an apparatus for wireless communications. The apparatus generally includes at least one processor and a memory coupled to the at least one processor. The processor is configured to acquire system time in a second RAT while receiving service in a first RAT, maintain the system time while receiving service in the first RAT, determine if a control channel in the second RAT will be present during an inter-transmission period of the first RAT based on the acquired system time and process the control channel in the second RAT if it is determined the control channel will be present in the inter-transmission period.

Certain aspects of the present disclosure provide a computer-program product for wireless communications, the computer-program product generally including a computer-readable medium comprising code. The code generally includes code for while receiving service in a first RAT, acquiring system time in a second RAT, maintaining the system time while receiving service in the first RAT, determining if a control channel in the second RAT will be present during an inter-transmission period of the first RAT based on the acquired system time and processing the control channel in the second RAT if it is determined the control channel will be present in the inter-transmission period.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
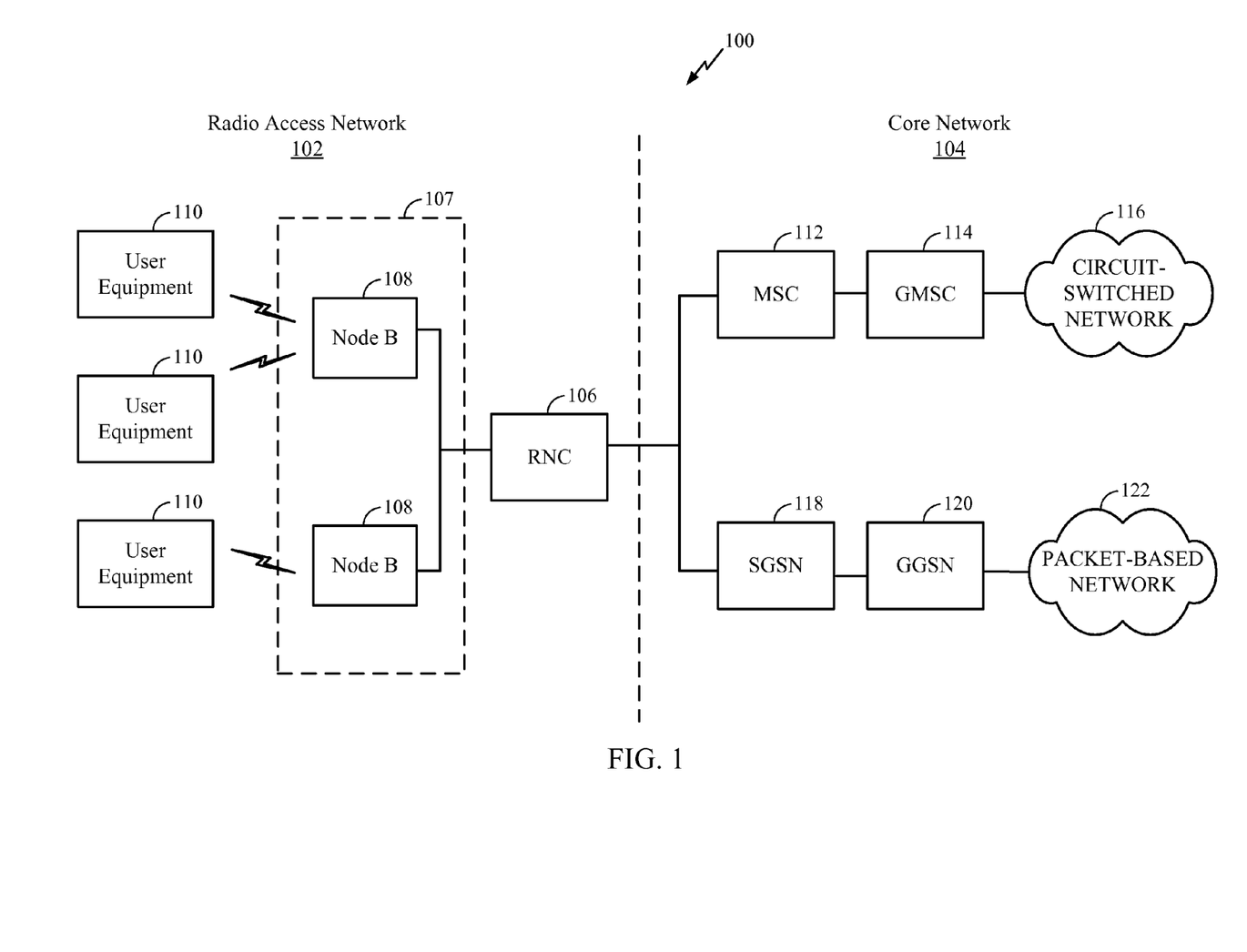
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
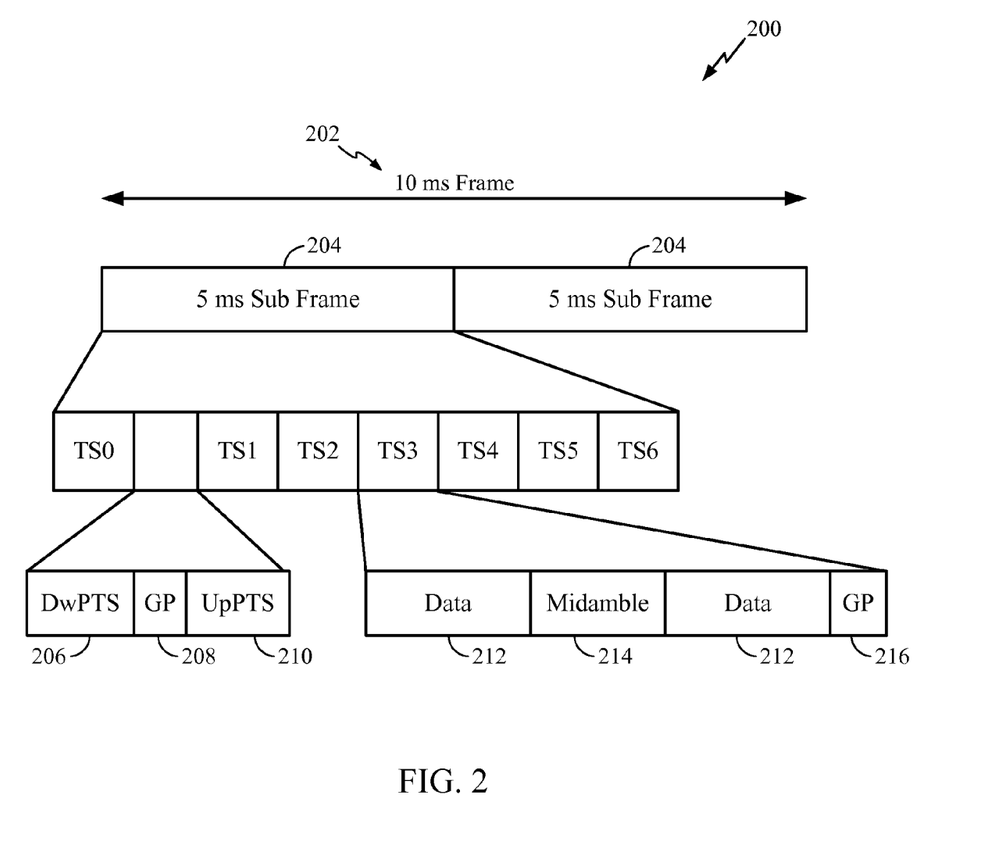
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
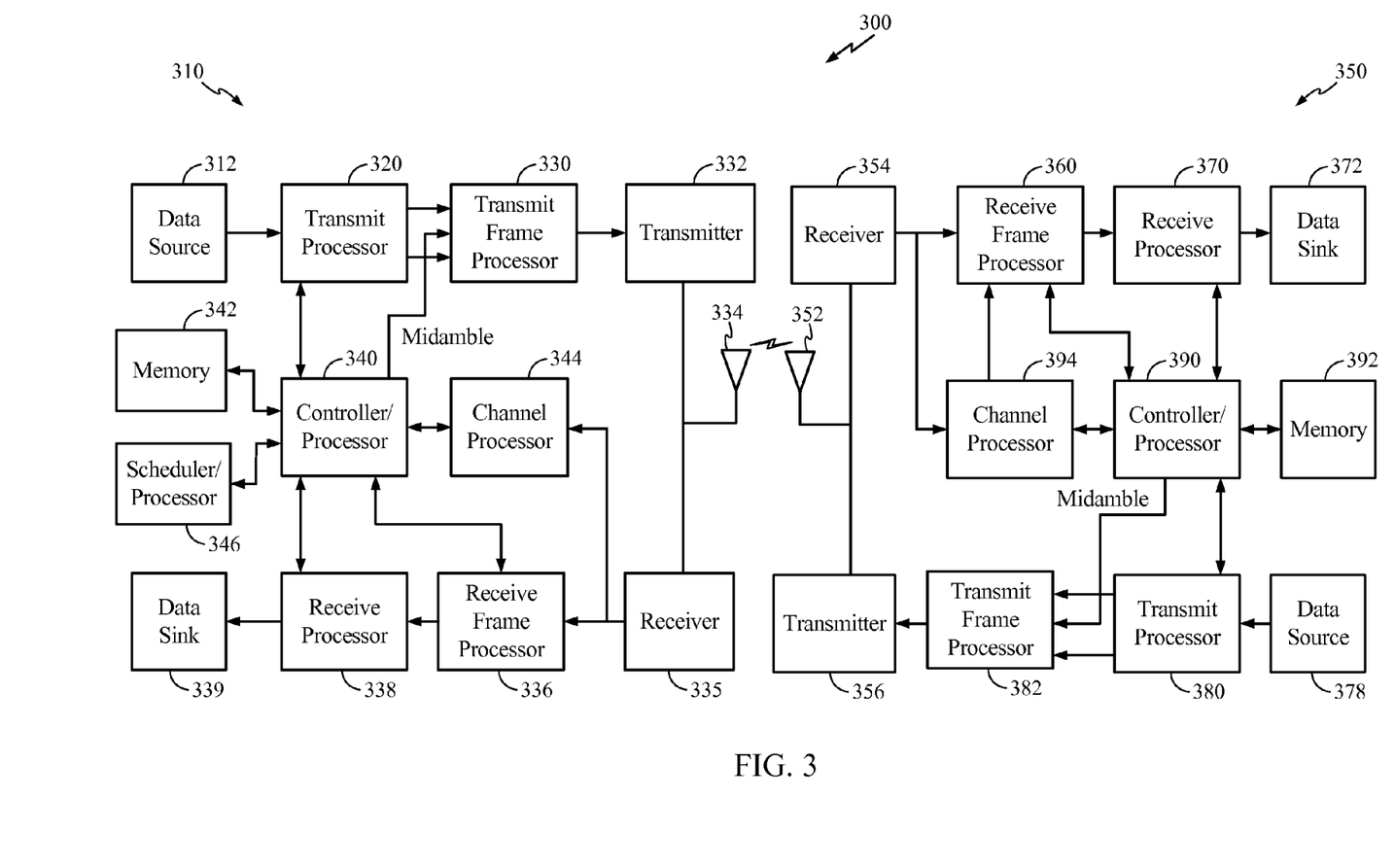
FIG. 3 is a block diagram conceptually illustrating an example of a Node B in communication with a UE in a telecommunications system.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

Example TD-SCDMA Measurement During GSM Call

Referring again to the TD-SCDMA frame 202 of FIG. 2, there is typically a switch between UL (Uplink) to DL (DL) transmissions in time slots TS2-TS5. For example, the switch from UL to DL may from TS3 (UL) to TS4 (DL). Thus, a typical TD-SCDMA frame includes 4 DL TSs and 3 UL TSs. In certain aspects, each TS may allow 16 code channels to be transmitted simultaneously.

A P-CCPCH (Primary Common Control Physical Channel) may transmitted in TS0 by a Node B (NB). The P-CCPCH typically uses the first two code channels in TS0 of each subframe.

According to certain aspects, in order to take measurements of the TD-SCDMA cell, a UE (User Equipment) acquires the timing of the 5 ms subframe 204 and measures the RSCP (Received Signal Code Power) of the P-CCPCH.

In a GSM network, transmissions are structured into frames of a defined format. Each GSM frame typically has a time duration of 120/26 ms. Further, as illustrated in FIG. 4, each GSM frame typically includes 8 burst periods (BPs), each BP of 15/26 ms.

Figure 4:
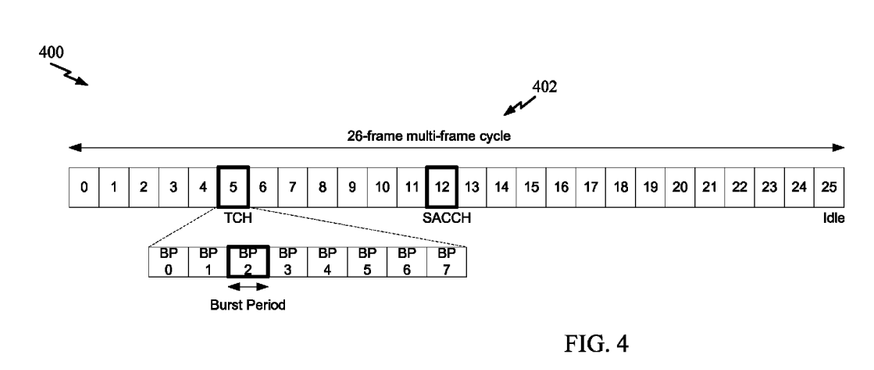
FIG. 4 is a functional block diagram conceptually illustrating an example of a GSM frame structure with resource allocation for a full rate voice call.

FIG. 4 is a functional block diagram conceptually illustrating an example of a GSM frame structure 400. A full rate voice call is allocated according to a 120 ms multi-frame cycle 402, with 26 frames (frames 0 to 25).

Within each cycle, a full rate voice call may be allocated 24 BPs for TCH (Traffic Channel), a BP per frame of frames 0-11, 13-24. For example, BP2 of frame 5 may be allocated for TCH, one BP of frame 12 may be allocated for SACCH (Slow Associated Control Channel), and frame 25 may be allocated as an idle frame.

Figure 5:
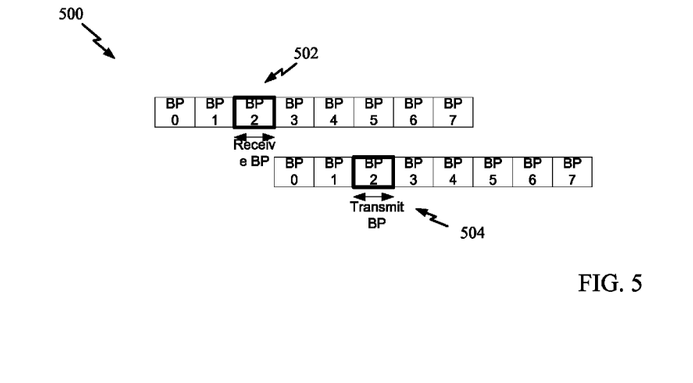
FIG. 5 is a functional block diagram conceptually illustrating an example of a delay between transmit and receive burst periods (BPs) in a GSM frame.

According to certain aspects, there may be a 3 BP delay between transmit and receive BPs. For example, FIG. 5 is a functional block diagram 500 conceptually illustrating an example of a delay between transmit and receive burst periods (BPs) of GSM frames. In FIG. 5, transmit BP 2 504 trails the receive BP 2 502 by 3 BPs.

Transmission and receiving BPs are typically performed on different frequency channels. Therefore, the UE may use the idle duration (not transmitting or receiving) in each frame to measure the TD-SCDMA cells. The UE may also use the last idle frame (e.g., frame 25) in the 120 ms multi-frame cycle to measure the TD-SCDMA cells.

According to certain aspects, if the UE wishes to use the inter-transmission periods (periods between transmit period and receive period) to measure the TD-SCDMA, the UE may only use the time interval after the end of transmit period and before the next receive period starts. The other inter-transmission interval (after receive period and before transmit period) may not be used for such a measurement as the period is typically too short to tune back and forth (between TD-SCDMA and GSM).

Figure 6:
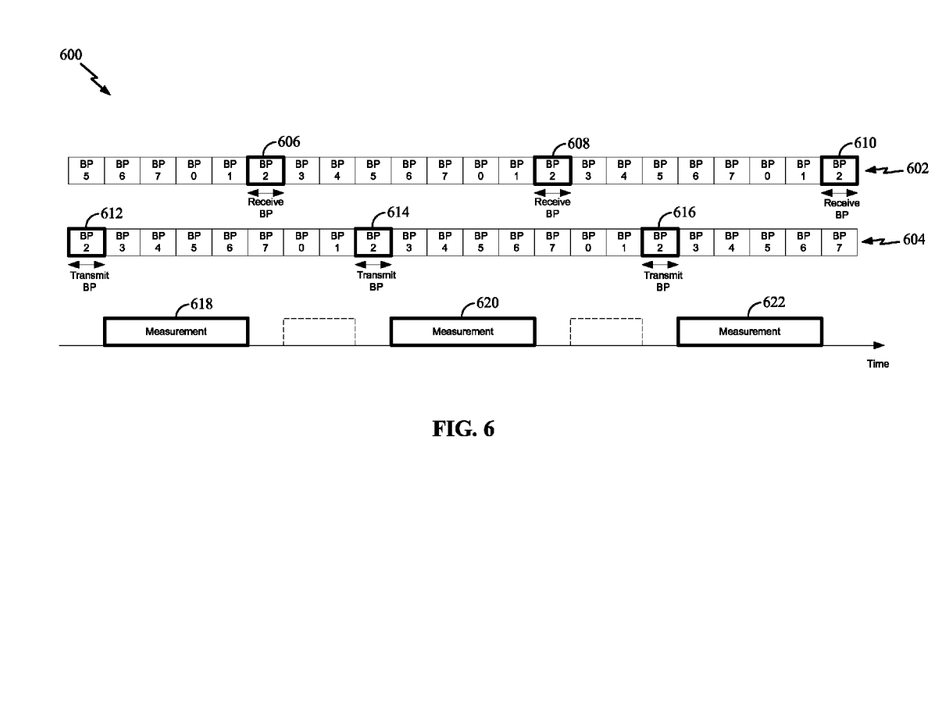
FIG. 6 is a functional block diagram conceptually illustrating examples of measurement time periods between transmit and receive BPs in accordance with certain aspects of the present disclosure.

This available measurement period is illustrated in FIG. 6, which shows a functional block diagram of measurement time periods between transmit and receive BPs in accordance with certain aspects of the present disclosure.

As illustrated, measurement time periods 618, 620 and 622 are intervals between the end of transmit periods in frame cycle 604 and starting receive time periods in frame cycle 602. For example, measurement period 618 is the time interval between transmit BP 612 of frame cycle 604 and receive BP 606 of frame cycle 602. Similarly, measurement time period 620 is the time interval between transmit BP 614 and receive BP 608 and measurement time period 622 is the time interval between transmit BP 616 and receive BP 610.

As shown in FIG. 6, the measurement time periods may provide 4 BP (e.g., 60/26=2.3 ms) for TD-SCDMA measurements. According to certain aspects, it may be challenging to perform the TD-SCDMA measurement in such a short time period since, at each available inter-transmission time period, the UE needs to tune to the TD-SCDMA frequency and perform measurements (e.g., receive signal, decode P-CCPCH, etc.). Typically, only after acquisition of P-CCPCH successfully for a few subsequent subframes will the UE start to measure the P-CCPCH.

One of the more critical issues in the measurement of the TD-SCDMA cell is detection of the 5 ms subframe boundary of the TD-SCDMA frame in the GSM active call state. Certain aspects of the present disclosure provide a technique to pre-acquire the TD-SCDMA timing at various time instances, in an effort to assist in this detection. As an example, TD-SCDMA timing may be pre-acquired periodically in GSM idle states. Periods as long as 5 minutes may suffice.

As another example, TD-SCDMA timing may be pre-acquired just before call origination or answering pages. However, to avoid delays to set up the call, the UE may only perform pre-acquisition of the TD-SCDMA timing within some timer. If the timer expires, the UE may stop the pre-acquisition of the TD-SCDMA and resume GSM call setup procedure. The timer may be, for example, on the order of few hundred milliseconds.

With the above pre-acquisition opportunities, the UE may be able to maintain the TD-SCDMA 5 ms subframe timing with a local clock. The UE may then continuously update the local TD-SCDMA 5 ms subframe timing, for example, with the above-described periodic pre-acquisition during GSM idle states.

If the UE receives a command from the GSM network to perform measurement of TD-SCDMA cells, the UE may use the locally maintained 5 ms TD-SCDMA subframe timing to determine the starting boundary of TS0 and, therefore, may easily detect the P-CCPCH channel, even in the relatively short available measurement period.

Figure 7:
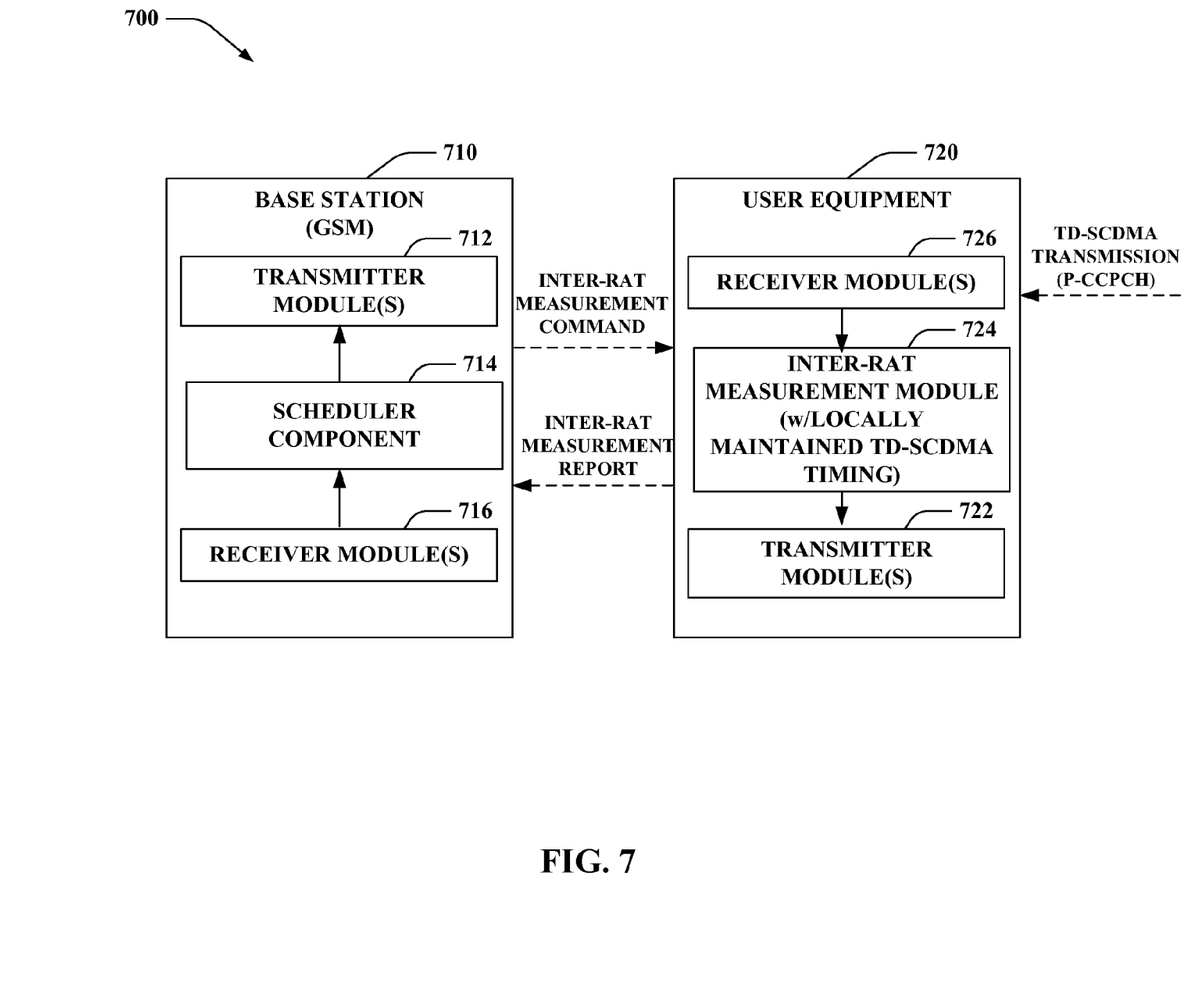
FIG. 7 illustrates example components of a base station and user equipment in accordance with certain aspects of the present disclosure.

FIG. 7 illustrates example components of a user equipment (UE 720) that may perform operations in accordance with certain aspects of the present disclosure.

FIG. 7 illustrates an example GSM BS 710 that may have a schedule component 714 configured to schedule GSM communications with the UE 720. As illustrated, the GSM BS 710 may send, via a transmitter module 712, commands for the UE 720 to perform inter-RAT measurements.

As illustrated, the UE 720 may receive the commands, via a receiver module 726, perform the inter-RAT measurements, and transmit corresponding reports to the GSM BS 710, via a transmitter module 722. The GSM BS 710 may receive the reports, via a receiver module 716, and process the reports accordingly (e.g., making handover decisions and the like).

As illustrated, the UE 720 may include an Inter-RAT measurement module 724 configured to perform Inter-RAT measurements as instructed by the GSM BS 710. The Inter-RAT measurement module 724 may be configured to maintain local TD-SCDMA timing, as described above. For example, the Inter-RAT measurement module 724 may be configured to pre-acquire TD-SCDMA timing during GSM idle states and maintain the TD-SCDMA timing with a local clock. As described above, this may help perform measurements by greatly reducing the amount of time needed to successfully acquire and measure P-CCPCH in the TD-SCDMA network.

Figure 8:
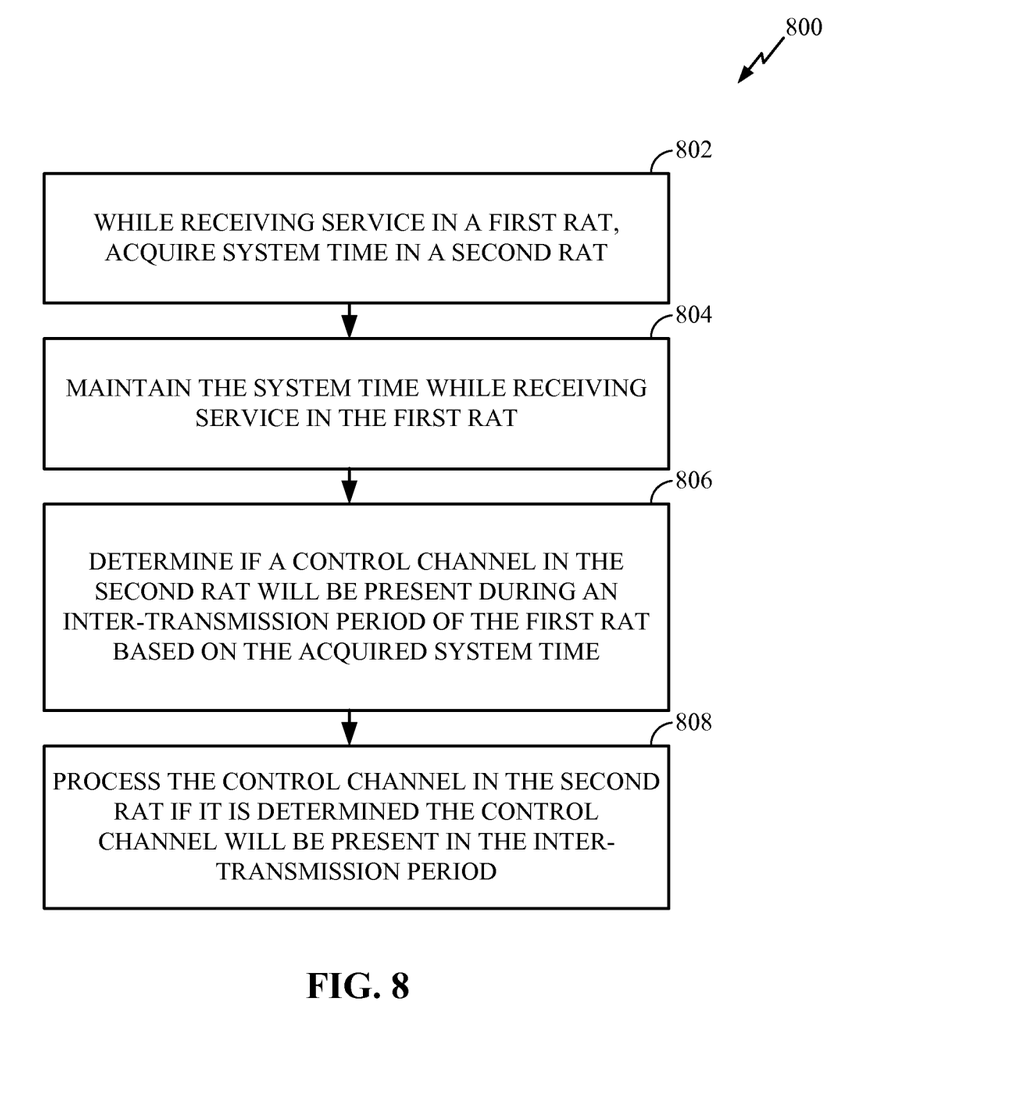
FIG. 8 illustrates example operations that may be performed by a user terminal in accordance with certain aspects of the present disclosure.

FIG. 8 illustrates example operations 800 that may be performed by a UE, such as UE 720 of FIG. 7, in accordance with certain aspects of the present disclosure.

The operations 800 begin, at 802, by acquiring system time in a second RAT (Radio Access Technology) while receiving service in a first RAT. As described above, the first RAT may be GSM, while the second RAT is TD-SDCMA.

At 804, the system time may be maintained while still receiving service in the first RAT. At 806, it is determined if a control channel in the second RAT will be present during an inter-transmission period of the first RAT based on the acquired system time. At 808, the control channel is processed in the second RAT if it is determined that the control channel will be present in the inter-transmission period.

As an example, a UE receiving GSM service may first check (e.g., based on the locally maintained TD-SCDMA timing) whether or not the inter-transmission time interval covers the TD-SCDMA TS0 before performing a measurement. For example, if the TD-SCDMA subframe starting time, T_subframe, is not in a particular inter-transmission time interval, then there may be no need to perform TD-SCDMA measurement. On the other hand, if the subframe starting time is in a particular inter-transmission time interval [T_meas_start, T_meas_end], then the UE may perform measurements, if it determines it possible to tune away and back in time.

This may be determined based on the following two conditions which, if met, may indicate sufficient time for a measurement. In the following, T_slot refers to the TD-SCDMA time slot duration (e.g., 864 chips or 0.675 ms), while T_tune refers to the latency to tune to another RAT.

The first condition is whether the UE can tune to the TD-SCDMA network before the TD-SDCMA starting time (e.g., if T_meas_start+T_tune<T_subframe). The second condition is whether the UE can take the measurement and tune back before the end of the measurement interval (e.g., T_subframe+T_slot+T_tune<T_meas_end).

Figure 9:
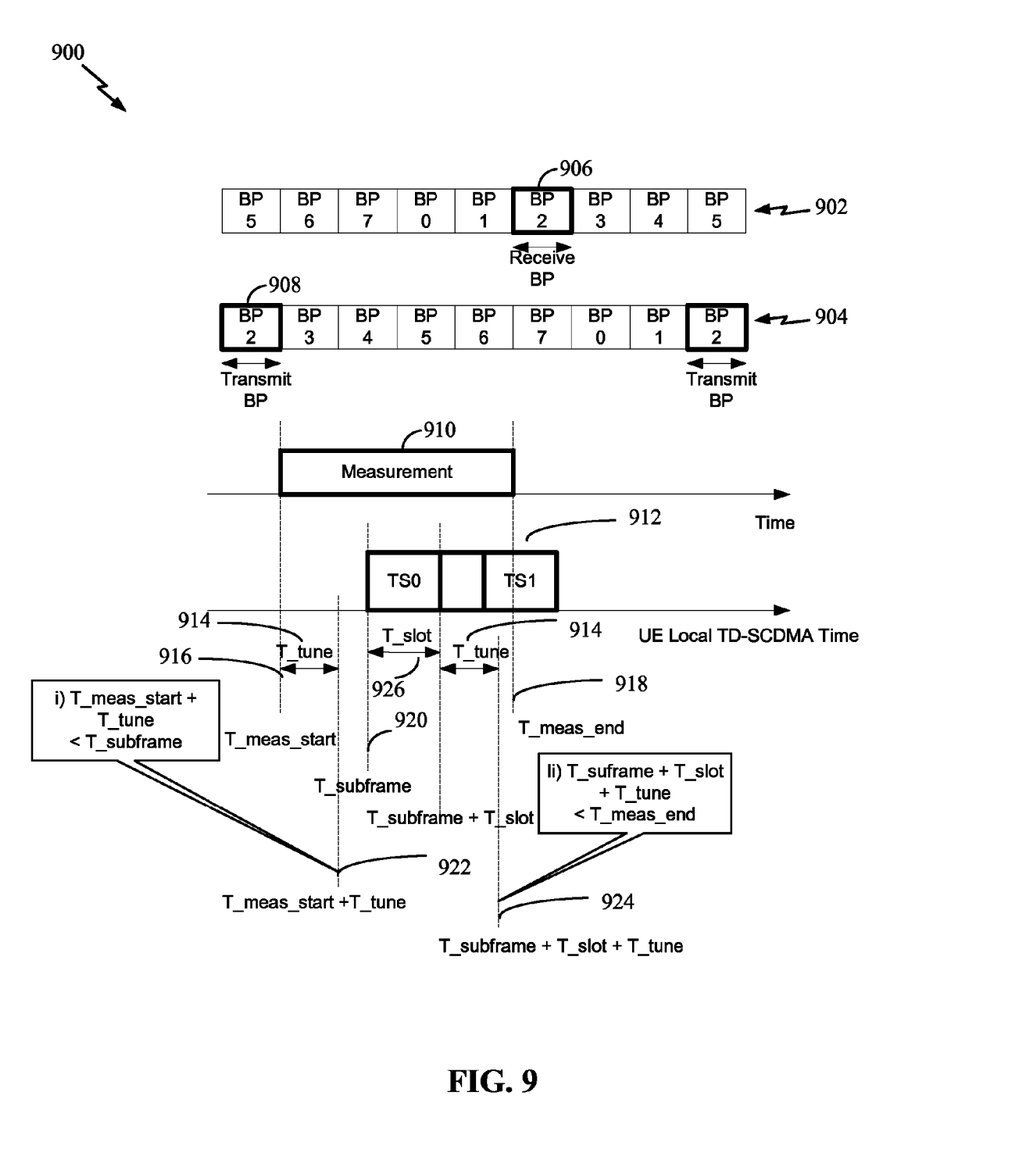
FIG. 9 is a functional block diagram conceptually illustrating an example of a measurement of TD-SCDMA cells in accordance with certain aspects of the present disclosure.

FIG. 9 is a functional block diagram 900 conceptually illustrating these conditions. Measurement period 910 represents a time interval between transmit BP 908 and receive BP 906. As discussed in the earlier paragraphs, the measurement period 910 is typically the time interval between the end of a transmit period and the start of receive period. The UE local TD-SCDMA time 912 may be maintained by a local UE clock.

According to certain aspects the UE may check whether or not the inter-transmission time interval covers the TD-SCDMA TS0. If not, there may be no need to perform TD-SCDMA measurement. In the illustrated example, however, TS0 does fall in between the measurement interval defined by T_meas_start 916 and T_meas_end 918.

Further, in this example, the first condition is met as the UE is able to tune to the TD-SCDMA network before the TD-SDCMA starting time (e.g., T_meas_start 916+T_tune 914<T_subframe 920). The second condition is also met as the UE is able to take the measurement and tune back before the end of the measurement interval (e.g., T_subframe 920+T_slot 926+T_tune 914<T_meas_end 918).

Thus, with prior knowledge of the TD-SCDMA timing, the UE can determine whether or not there is sufficient time to tune to the TD-SCDMA network and measure P-CCPCH channel only when there is TS0 in the inter-transmission period. If there is no TS0, then UE may perform other activities, such as power saving or measuring non-TD-SCDMA cells. In this manner, the techniques described herein may help a UE efficiently perform TD-SCDMA measurement during a GSM call and support the GSM to TD-SCDMA handover.

Several aspects of a telecommunications system has been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communications, comprising:
   acquiring system time of a second RAT (Radio Access Technology) while a user equipment (UE) is receiving service from a first RAT;
   maintaining, at the UE, the system time with a local clock while receiving service from the first RAT;
   determining, at the UE, whether a subframe comprising a control channel of the second RAT is within an inter-transmission period, a location of the subframe being determined based at least in part on the system time maintained with the local clock, the determining being performed in response to a measurement request from a serving base station of the first RAT; and
   processing the control channel of the second RAT during the inter-transmission period.

2. The method of claim 1, wherein acquiring the system time of the second RAT comprises acquiring the system time before a call origination or answering a page.

3. The method of claim 1, wherein acquiring the system time of the second RAT comprises periodically acquiring the system time during an idle state of the first RAT.

4. The method of claim 1, further comprising determining if there is sufficient time in the inter-transmission period to tune to the second RAT to process the control channel and tune back to the first RAT.

5. The method of claim 1, wherein the inter-transmission period comprises an idle frame.

6. The method of claim 1, wherein the inter-transmission period comprises a gap between receive and transmit burst periods (BPs).

7. The method of claim 1, wherein the inter-transmission period comprises an inter-transmission period of a voice call.

8. The method of claim 1, wherein the inter-transmission period comprises an inter-transmission period of a data call.

9. The method of claim 1, wherein the first RAT comprises Global System for Mobile Communications (GSM).

10. The method of claim 1, wherein the second RAT comprises Time Division-Synchronous Code Division Multiple Access (TD-SCDMA).

11. An apparatus for wireless communications, comprising:
    means for acquiring system time of a second RAT (Radio Access Technology) while a user equipment (UE) is receiving service from a first RAT;
    means for maintaining, at the UE, the system time with a local clock while receiving service from the first RAT;
    means for determining, at the UE, whether a subframe comprising a control channel of the second RAT is within an inter-transmission period, a location of the subframe being determined based at least in part on the system time maintained with the local clock, the determining being performed in response to a measurement request from a serving base station of the first RAT; and
    means for processing the control channel of the second RAT when it is determined the control channel will be present in the inter-transmission period.

12. The apparatus of claim 11, wherein the means for acquiring the system time of the second RAT further comprises means acquiring the system time before a call origination or answering a page.

13. The apparatus of claim 11, wherein the means for acquiring the system time of the second RAT further comprises means for periodically acquiring the system time during an idle state of the first RAT.

14. The apparatus of claim 11, further comprising means for determining if there is sufficient time in the inter-transmission period to tune to the second RAT to process the control channel and tune back to the first RAT.

15. The apparatus of claim 11, wherein the inter-transmission period comprises an idle frame.

16. The apparatus of claim 11, wherein the inter-transmission period comprises a gap between receive and transmit burst periods (BPs).

17. The apparatus of claim 11, wherein the inter-transmission period comprises an inter-transmission period of a voice call.

18. The apparatus of claim 11, wherein the inter-transmission period comprises an inter-transmission period of a data call.

19. The apparatus of claim 11, wherein the first RAT comprises Global System for Mobile Communications (GSM).

20. The apparatus of claim 11, wherein the second RAT comprises Time Division-Synchronous Code Division Multiple Access (TD-SCDMA).

21. An apparatus for wireless communications, comprising:
    at least one processor configured to:
    acquire, at a user equipment (UE), system time of a second RAT (Radio Access Technology) while receiving service from a first RAT;
    maintain, at the UE, the system time with a local clock while receiving service from the first RAT;
    determine, at the UE, whether a subframe comprising a control channel of the second RAT is within an inter-transmission period, a location of the subframe being determined based at least in part on the system time maintained with the local clock, the determining being performed in response to a measurement request from a serving base station of the first RAT; and
    process the control channel of the second RAT when it is determined the control channel will be present in the inter-transmission period; and
    a memory coupled to the at least one processor.

22. The apparatus of claim 21, wherein the at least one processor is further configured to acquire the system time before a call origination or answering a page.

23. The apparatus of claim 21, wherein the at least one processor is further configured to periodically acquire the system time during an idle state of the first RAT.

24. The apparatus of claim 21, wherein the processor is further configured to determine if there is sufficient time in the inter-transmission period to tune to the second RAT to process the control channel and tune back to the first RAT.

25. The apparatus of claim 21, wherein the inter-transmission period comprises an idle frame.

26. The apparatus of claim 21, wherein the inter-transmission period comprises a gap between receive and transmit burst periods (BPs).

27. The apparatus of claim 21, wherein the inter-transmission period comprises an inter-transmission period of a voice call.

28. The apparatus of claim 21, wherein the inter-transmission period comprises an inter-transmission period of a data call.

29. The apparatus of claim 21, wherein the first RAT comprises Global System for Mobile Communications (GSM).

30. The apparatus of claim 21, wherein the second RAT comprises Time Division-Synchronous Code Division Multiple Access (TD-SCDMA).

31. A computer-program product for wireless communications comprising:
   a non-transitory computer-readable medium comprising code for:
   acquiring system time of a second RAT 1Radio Access Technology) while a user equipment (UE) is receiving service from a first RAT;
   maintaining, at the UE, the system time with a local clock while receiving service from the first RAT;
   determining, at the UE, whether a subframe comprising a control channel of the second RAT is within an inter-transmission period, a location of the subframe being determined based at least in part on the system time maintained with the local clock, the determining being performed in response to a measurement request from a serving base station of the first RAT; and
   processing the control channel of the second RAT when it is determined the control channel will be present in the inter-transmission period.

32. The computer-program product of claim 31, wherein the code for acquiring the system time further comprises code for acquiring the system time before a call origination or answering a page.

33. The computer-program product of claim 31, wherein the code for acquiring the system time further comprises code for periodically acquiring the system time during an idle state of the first RAT.

34. The computer-program product of claim 31, wherein the code further comprises code for determining if there is sufficient time in the inter-transmission period to tune to the second RAT to process the control channel and tune back to the first RAT.

35. The computer-program product of claim 31, wherein the inter-transmission period comprises an idle frame.

36. The computer-program product of claim 31, wherein the inter-transmission period comprises a gap between receive and transmit burst periods (BPs).

37. The computer-program product of claim 31, wherein the inter-transmission period comprises an inter-transmission period of a voice call.

38. The computer-program product of claim 31, wherein the inter-transmission period comprises an inter-transmission period of a data call.

39. The computer-program product of claim 31, wherein the first RAT comprises Global System for Mobile Communications (GSM).

40. The computer-program product of claim 31, wherein the second RAT comprises Time Division-Synchronous Code Division Multiple Access (TD-SCDMA).

\* \* \* \* \*